(12) United States Patent
Rose (10) Patent No.: US 9,995,487 B2
(45) Date of Patent: Jun. 12, 2018

(54) METHOD FOR REPAIRING FUEL NOZZLE GUIDES FOR GAS TURBINE ENGINE COMBUSTORS USING COLD METAL TRANSFER WELD TECHNOLOGY

(71) Applicant: United Technologies Corporation, Hartford, CT (US)

(72) Inventor: William M. Rose, Warren, MA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days. days.

(21) Appl. No.: 14/684,465

(22) Filed: Apr. 13, 2015

(65) Prior Publication Data

US 2015/0211741 A1 Jul. 30, 2015

Related U.S. Application Data

(62) Division of application No. 13/209,612, filed on Aug. 15, 2011, now Pat. No. 9,021,675.

(51) Int. Cl.
| | |
|---|---|
| *F23R 3/28* | (2006.01) |
| *B23K 9/04* | (2006.01) |
| *B23K 9/028* | (2006.01) |
| *B23K 9/173* | (2006.01) |
| *B23P 6/00* | (2006.01) |
| *F01D 5/00* | (2006.01) |
| *B23K 101/00* | (2006.01) |

(52) U.S. Cl.
CPC ................ *F23R 3/28* (2013.01); *B23K 9/028* (2013.01); *B23K 9/04* (2013.01); *B23K 9/042* (2013.01); *B23K 9/173* (2013.01); *B23P 6/007* (2013.01); *F01D 5/005* (2013.01); *B23K 2201/001* (2013.01); *F05D 2230/232* (2013.01); *F05D 2230/30* (2013.01); *F23R 2900/00019* (2013.01); *Y10T 29/49348* (2015.01); *Y10T 29/49728* (2015.01)

(58) Field of Classification Search
CPC .... F23R 3/28; F23R 2900/00019; B23K 9/04; B23K 9/042; B23K 9/173; B23K 9/028; B23K 2201/001; B23P 6/007; F01D 5/005; Y10T 29/49728; Y10T 29/49348; F05D 2230/232; F05D 2230/30
See application file for complete search history.

(56) References Cited

U.S. PATENT DOCUMENTS

| | | |
|---|---|---|
| 4,322,945 A | 4/1982 | Peterson et al. |
| 4,365,470 A | 12/1982 | Matthews et al. |

(Continued)

FOREIGN PATENT DOCUMENTS

| | | |
|---|---|---|
| EP | 2113330 | 11/2009 |
| EP | 2116691 | 11/2009 |

(Continued)

OTHER PUBLICATIONS

Singapore Search Report for Singapore Patent Application No. 20120507-9 completed on Apr. 15, 2013.

(Continued)

*Primary Examiner* — John C Hong
(74) *Attorney, Agent, or Firm* — Carlson, Gaskey & Olds, P.C.

(57) ABSTRACT

A fuel nozzle guide for a combustor of a turbine engine includes an annular base with a hub section, the hub section at least partially formed of a Cold Metal Transfer (CMT) weld and a method and system therefor.

23 Claims, 7 Drawing Sheets

(56) References Cited

U.S. PATENT DOCUMENTS

| | | | |
|---|---|---|---|
| 4,870,818 | A | 10/1989 | Suliga |
| 4,934,145 | A | 6/1990 | Zeisser |
| 5,419,115 | A | 5/1995 | Butler et al. |
| 5,463,864 | A | 11/1995 | Butler et al. |
| 5,524,438 | A | 6/1996 | Johnson et al. |
| 5,542,246 | A | 8/1996 | Johnson et al. |
| 5,577,379 | A | 11/1996 | Johnson |
| 5,581,999 | A | 12/1996 | Johnson |
| 6,032,457 | A | 3/2000 | McKinney et al. |
| 6,038,862 | A | 3/2000 | Melman et al. |
| 6,047,551 | A | 4/2000 | Ishiguro et al. |
| 6,164,074 | A | 12/2000 | Madden et al. |
| 6,240,731 | B1 | 6/2001 | Hoke et al. |
| 6,412,272 | B1 | 7/2002 | Titterton, III et al. |
| 6,469,271 | B1 | 10/2002 | McGoey |
| 6,679,063 | B2 | 1/2004 | Ebel |
| 6,735,950 | B1 | 5/2004 | Howell et al. |
| 7,093,441 | B2 | 8/2006 | Burd et al. |
| 7,140,185 | B2 | 11/2006 | Burd |
| 7,165,325 | B2 | 1/2007 | Imano et al. |
| 7,498,543 | B2 | 3/2009 | Ruokolainen et al. |
| 7,513,116 | B2 | 4/2009 | Hebert et al. |
| 7,759,603 | B2 | 7/2010 | Aigner et al. |
| 2009/0212090 | A1 | 8/2009 | Hepp et al. |
| 2009/0255102 | A1 | 10/2009 | McMasters et al. |
| 2009/0274553 | A1 | 11/2009 | Bunting |

FOREIGN PATENT DOCUMENTS

| | | |
|---|---|---|
| JP | 2007290005 | 11/2007 |
| WO | 2009126701 | 10/2009 |

OTHER PUBLICATIONS

Extended European Search Report for European Application No. 12180472.8, dated Sep. 15, 2015.

METHOD FOR REPAIRING FUEL NOZZLE GUIDES FOR GAS TURBINE ENGINE COMBUSTORS USING COLD METAL TRANSFER WELD TECHNOLOGY

CROSS-REFERENCE TO RELATED APPLICATION

This application is a divisional application of U.S. patent application Ser. No. 13/209,612 filed Aug. 15, 2011.

BACKGROUND

The present disclosure relates to a gas turbine engine and, more particularly, to a weld repair therefor.

Gas turbine engines, such as those powering modern commercial and military aircraft, include a compressor for pressurizing an airflow, a combustor for burning a hydrocarbon fuel in the presence of the pressurized air, and a turbine for extracting energy from the resultant combustion gases. The combustor generally includes radially spaced inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel nozzles project into a forward section of the combustion chamber through a respective fuel nozzle guide to supply the fuel to be mixed with the pressurized air.

Combustor components may require repair. Oftentimes, the repair is performed with gas tungsten arc welding, plasma arc welding and laser welding.

SUMMARY

A fuel nozzle guide for a combustor of a turbine engine according to an exemplary aspect of the present disclosure includes an annular base with a hub section, the hub section at least partially formed of a Cold Metal Transfer (CMT) weld.

In a further embodiment according to the foregoing embodiment, said hub section is frusto-conical.

In a further embodiment according any of the foregoing embodiments, said Cold Metal Transfer (CMT) weld defines a lip of said hub section.

In a further embodiment according any of the foregoing embodiments, said lip has a first diameter and said annular base has a second diameter, and said first diameter is less than said second diameter.

In a further embodiment according any of the foregoing embodiments, a portion of said fuel nozzle guide between said annular base and said lip has a third diameter, and said third diameter is less than said first and second diameters.

In a further embodiment according any of the foregoing embodiments, the fuel nozzle guide is a cast metal component.

In a further embodiment according any of the foregoing embodiments, the hub section defines a central opening configured to receive a fuel nozzle.

In a further embodiment according any of the foregoing embodiments, the central opening receives the at least one fuel nozzle in a slip fit relationship.

In a further embodiment according any of the foregoing embodiments, the central opening is configured to receive the fuel nozzle such that a centerline of the fuel nozzle guide is concurrent with a centerline of the fuel nozzle.

A combustor according to an exemplary aspect of the present disclosure includes a combustor case, first and second combustor liners within the combustor case, the first and second combustor liners defining a combustion chamber therebetween, and a forward assembly, the forward assembly including an annular hood, at least one bulkhead assembly, at least one fuel nozzle aligned with the at least one bulkhead assembly, and at least one fuel nozzle guide aligned with the at least one fuel nozzle to define at least one central opening, wherein the at least one fuel nozzle guide includes an annular base with a hub section, the hub section at least partially formed of a Cold Metal Transfer (CMT) weld.

In a further embodiment according any of the foregoing embodiments, the annular hood extends radially between, and is secured to, forwardmost ends of the first and second combustor liners.

In a further embodiment according any of the foregoing embodiments, the annular hood includes at least one circumferentially distributed hood port, the at least one circumferentially distributed hood port supporting the at least one fuel nozzle.

In a further embodiment according any of the foregoing embodiments, the at least one fuel nozzle projects through the at least one hood port and the at least one central opening within the at least one fuel nozzle guides.

In a further embodiment according any of the foregoing embodiments, at least one fuel nozzle guide projects through the at least one bulkhead assembly.

In a further embodiment according any of the foregoing embodiments, the at least one bulkhead assembly includes a bulkhead support shell secured to the first and second combustor liners and at least one circumferentially distributed bulkhead heatshields segment secured to the bulkhead support shell around the at least one central opening.

In a further embodiment according any of the foregoing embodiments, the Cold Metal Transfer (CMT) weld defines a lip of the hub section.

In a further embodiment according any of the foregoing embodiments, the lip is axially closer to said combustion chamber than the annular base along an axis of the annular hood.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
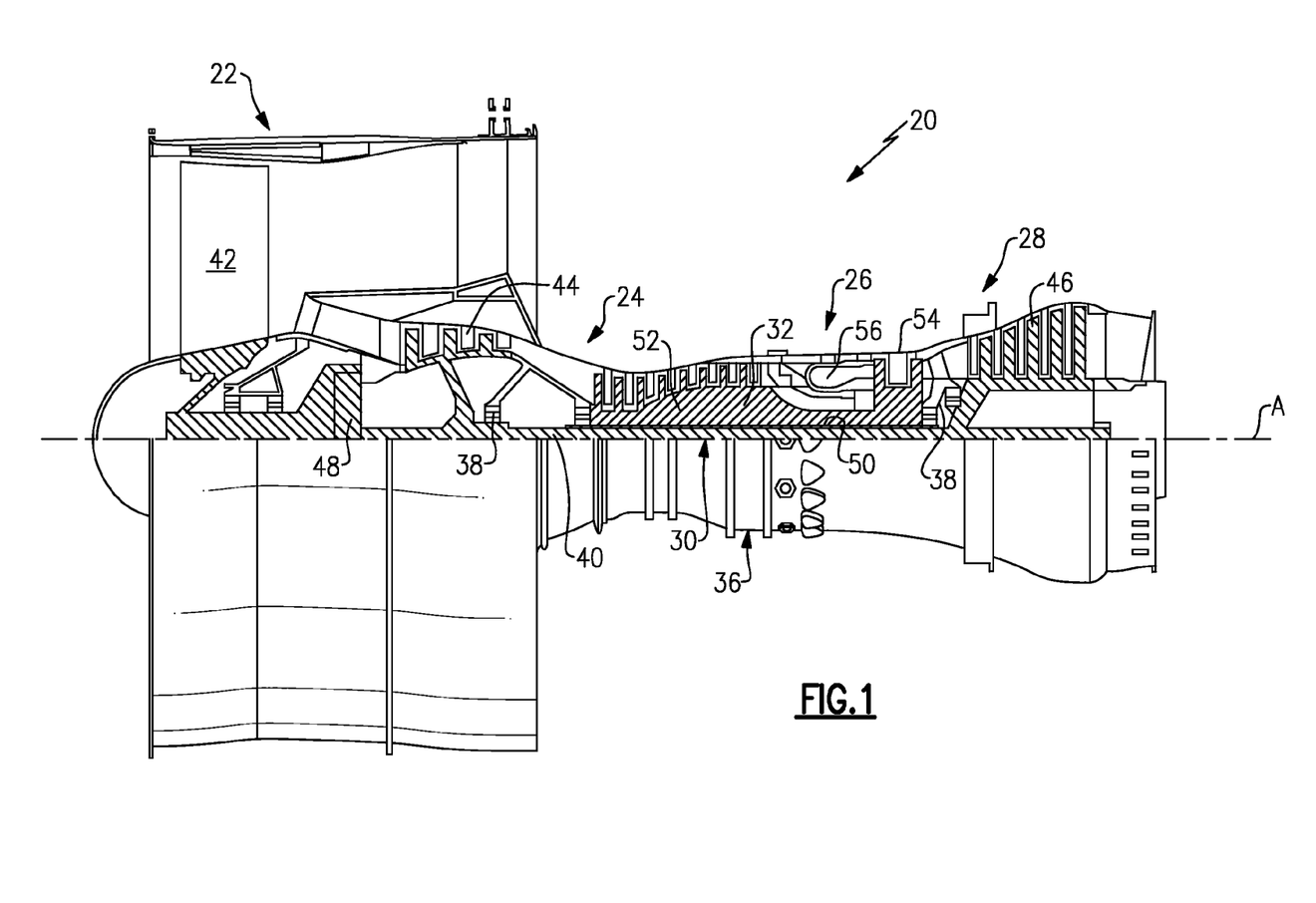
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel within the combustor 56, then expanded over the high pressure turbine 54 and low pressure turbine 46. The turbines 54, 46 rotationally drive the respective low speed spool 30 and high speed spool 32 in response to the expansion.

Figure 2:
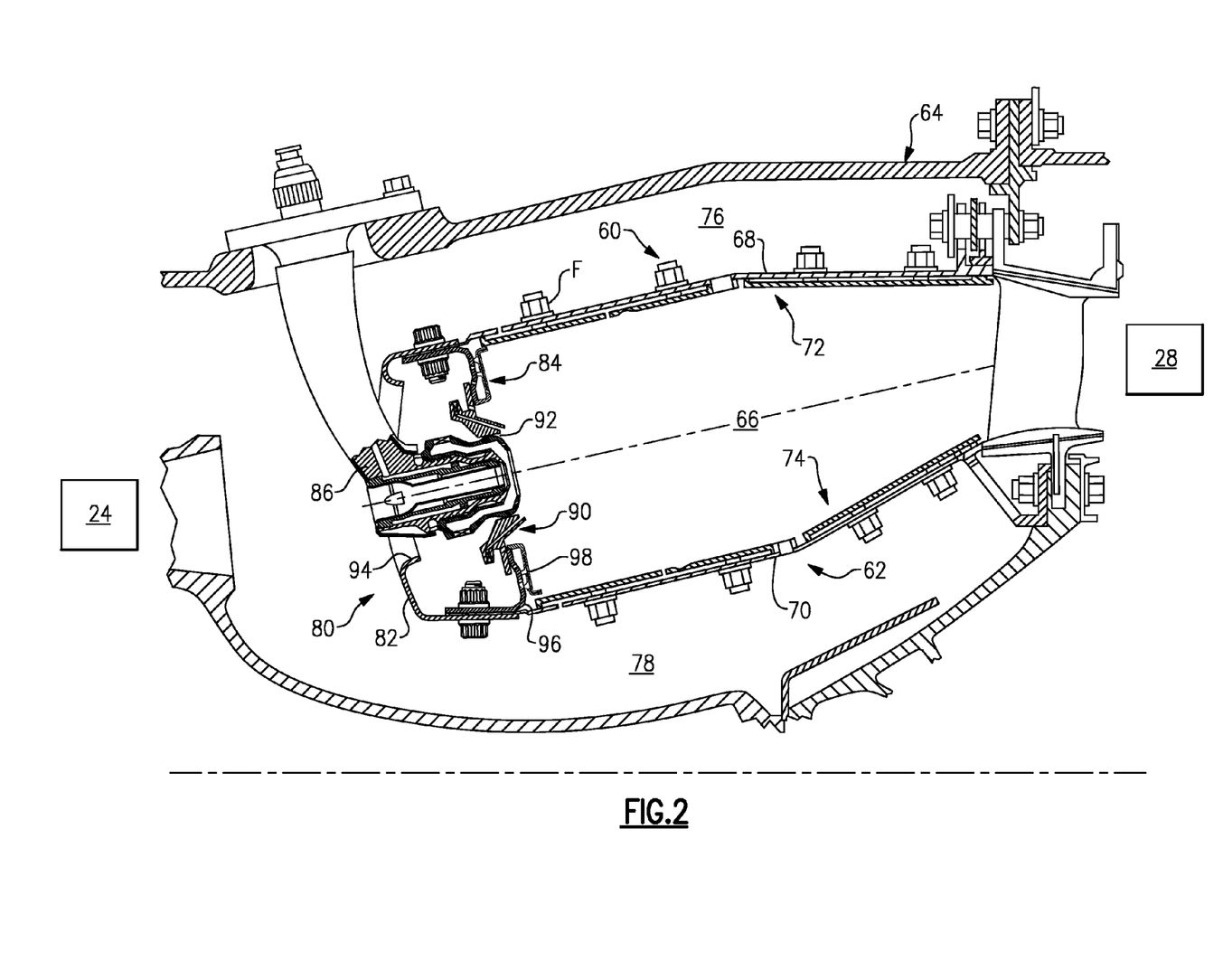
FIG. 2 is a perspective partial sectional view of an exemplary annular combustor that may be used with the gas turbine engine shown in FIG. 1.

With reference to FIG. 2, the combustor 56 generally includes an outer combustor liner 60 and an inner combustor liner 62. The outer combustor liner 60 and the inner combustor liner 62 are spaced inward from a combustor case 64 such that a combustion chamber 66 is defined there between. The combustion chamber 66 is generally annular in shape and is defined between combustor liners 60, 62.

The outer combustor liner 60 and the combustor case 64 define an outer annular plenum 76 and the inner combustor liner 62 and the combustor case 64 define an inner annular plenum 78. It should be understood that although a particular combustor is illustrated, other combustor types with various combustor liner panel arrangements will also benefit herefrom. It should be further understood that the disclosed cooling flow paths are but an illustrated embodiment and should not be limited only thereto.

The combustor liners 60, 62 contain the flame for direction toward the turbine section 28. Each combustor liner 60, 62 generally includes a support shell 68, 70 which supports one or more liner panels 72, 74 mounted to a hot side of the respective support shell 68, 70. The liner panels 72, 74 define a liner panel array which may be generally annular in shape. Each of the liner panels 72, 74 may be generally rectilinear and manufactured of, for example, a nickel based super alloy or ceramic material.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown) that defines a central opening 92. The annular hood 82 extends radially between, and is secured to, the forwardmost ends of the liners 60, 62. The annular hood 82 includes a multiple of circumferentially distributed hood ports 94 that accommodate the respective fuel nozzle 86 and introduce air into the forward end of the combustion chamber 66. Each fuel nozzle 86 may be secured to the outer case 64 and projects through one of the hood ports 94 and through the central opening 92 within the respective fuel nozzle guide 90.

Each of the fuel nozzle guides 90 is circumferentially aligned with one of the hood ports 94 to project through the bulkhead assembly 84. Each bulkhead assembly 84 includes a bulkhead support shell 96 secured to the liners 60, 62, and a multiple of circumferentially distributed bulkhead heatshields segments 98 secured to the bulkhead support shell 96 around the central opening 92.

The forward assembly 80 introduces primary core combustion air into the forward end of the combustion chamber 66 while the remainder enters the outer annular plenum 76 and the inner annular plenum 78. The multiple of fuel nozzles 86 and surrounding structure generate a swirling, intimately blended fuel-air mixture that supports combustion in the forward section of the combustion chamber 66.

Figure 3:
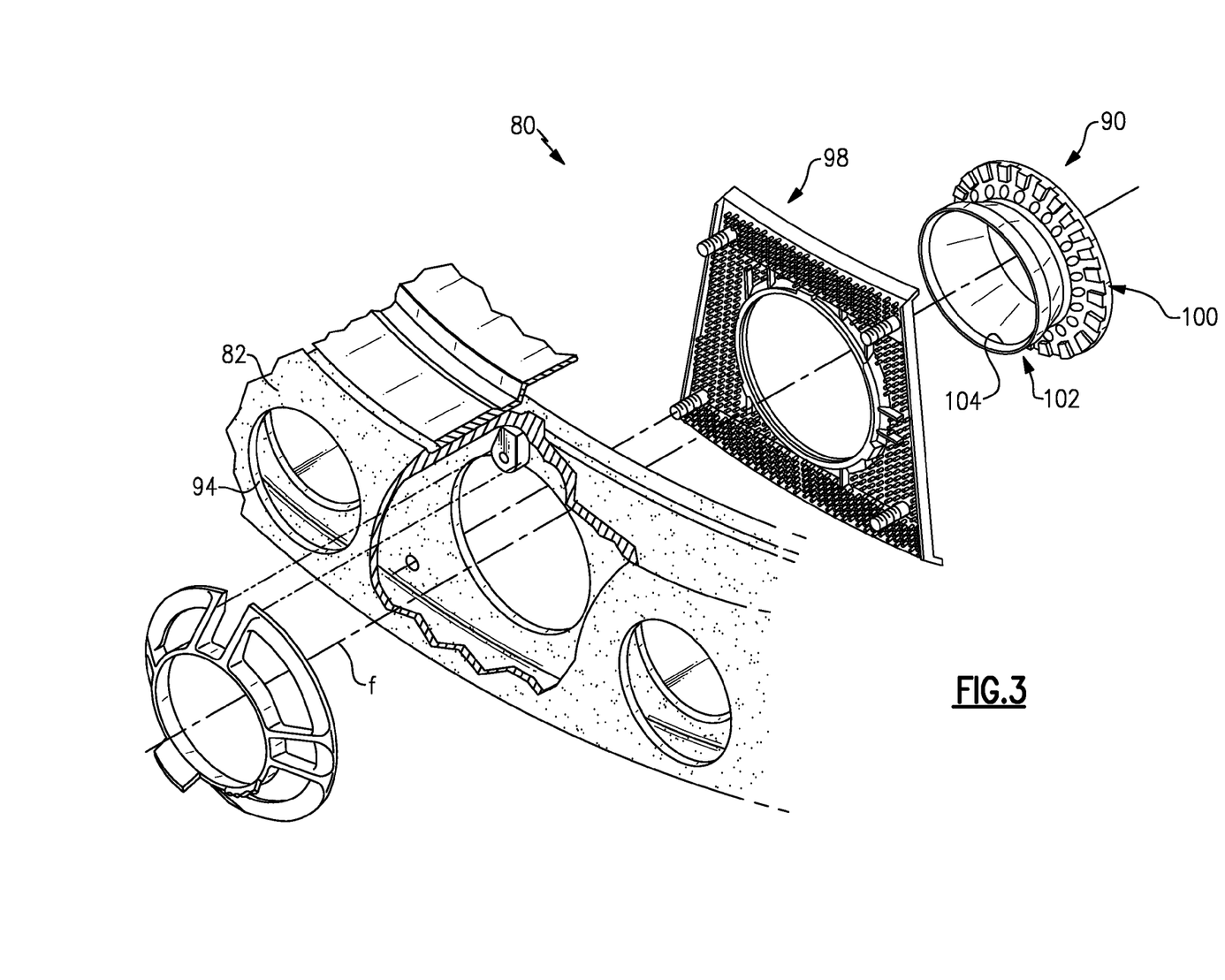
FIG. 3 is an exploded view of a forward assembly of the exemplary combustor with a fuel nozzle guide.

With reference to FIG. 3, each of the fuel nozzle guides 90 has a generally annular base 100 with an outwardly or downstream extending frusto-conical hub section 102 that forms the central opening 92 dimensioned for a snug slip-fit mounting of the fuel nozzle 86. The centerline of the fuel nozzle 86 is concurrent with the centerline F of the fuel nozzle guide 90.

The fuel nozzle guide 90 is typically a cast metal component subject to high wear due to exposure to the combustion chamber 66 and maintenance of the fuel nozzle 86. Typically, a lip 104 of the hub section 102 becomes highly worn such that a Cold Metal Transfer (CMT) weld technology is utilized with a semi automatic weld cycle to restore the lip 104 to original dimensions by the method disclosed herein (FIG. 4).

Figure 4:
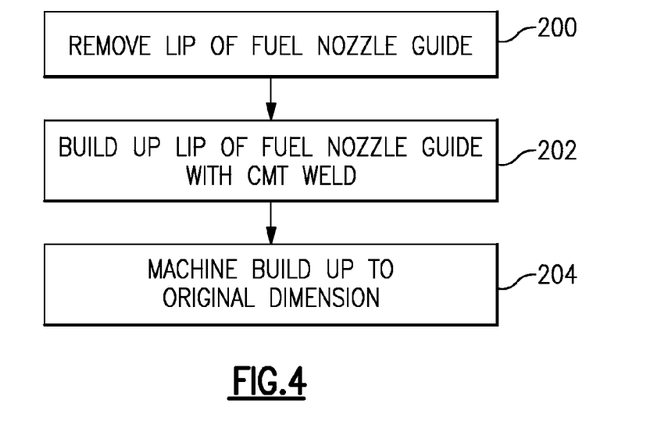
FIG. 4 is a method of repair for the fuel nozzle guide.
Figure 5:
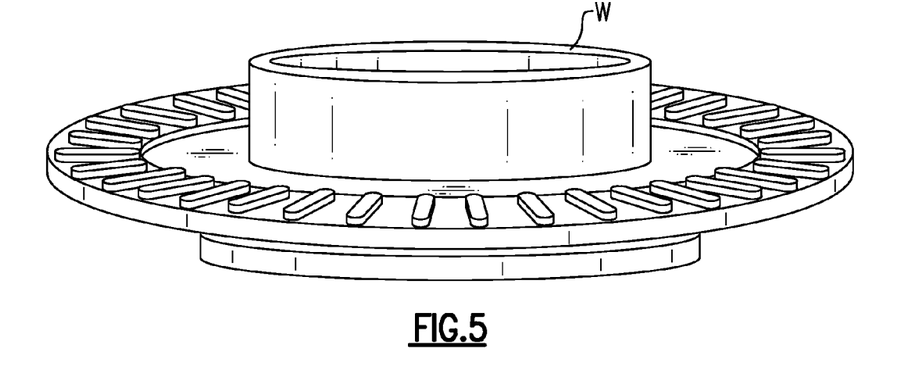
FIG. 5 is a perspective view of the fuel nozzle guide after a lip removal step.

With Reference to FIG. 4, step 200 of a manufacture or repair for the fuel nozzle guide 90 includes machining of the lip 104 to remove a desired amount of material and provide a weld ready surface W (FIG. 5). It should be understood that various geometries may be provided by the weld ready surface W and such surface may be flat or featured to facilitate a weld interface.

Figure 6:
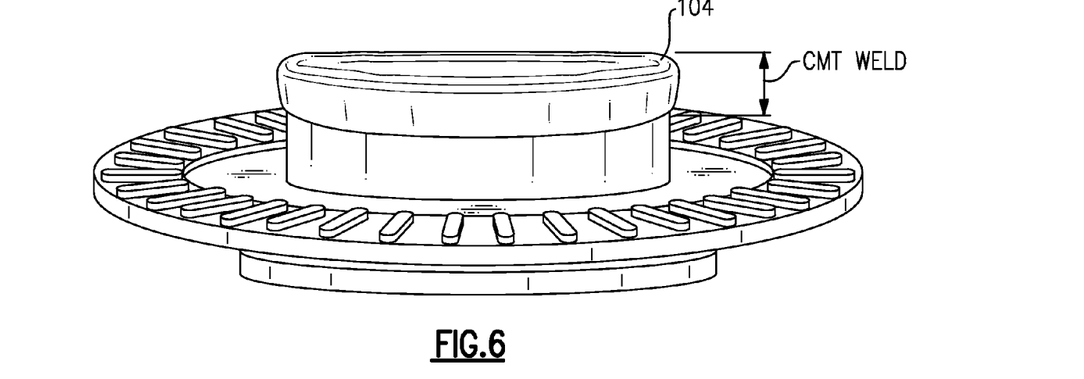
FIG. 6 is a perspective view of the fuel nozzle guide after a CMT weld buildup step.

Step 202 of the repair includes a weld cycle via Cold Metal Transfer (CMT) weld technology with an automated or robot-assisted torch T to build up the lip 104 (FIG. 6). Cold Metal Transfer (CMT) weld technology is based on short circuiting transfer, or in other words, on a deliberate, systematic discontinuing of the arc. Results are a sort of alternating "hot-cold-hot-cold" sequence. The "hot-cold" method significantly reduces the arc pressure. A wide process window and the high stability thereof define one Cold Metal Transfer (CMT) process. The weld wire material may be, for example, of a Hastelloy X, Stellite 31 or other aerospace grade weld material, such as nickel cobalt superalloy weld fillers. It should be understood that the weld material may be equivalent to the base material or may alternatively be a softer material than the base material. Every time short circuiting occurs, the control interrupts the power supply and controls the retraction of the weld wire. This motion takes place at a rate of up to, for example, about seventy (70) times per second. The weld wire retraction motion facilitates droplet detachment during the short circuit. The reduced thermal input also offers advantages such as low distortion and high precision.

The fuel nozzle guide 90 is rotated by a weld system 110 (FIG. 7) that also maintains the torch T in a stationary position and orientation as further described below. In the disclosed non-limiting embodiment, the CMT weld buildup height defines a height of about 0.080″ (20 mm-21 mm) in a continuous weld to define a single start and a single stop with a total weld time of approximately 111 seconds. It should be understood that various weld buildup heights may alternatively or additionally be provided based on the component and or repair required.

Figure 8:
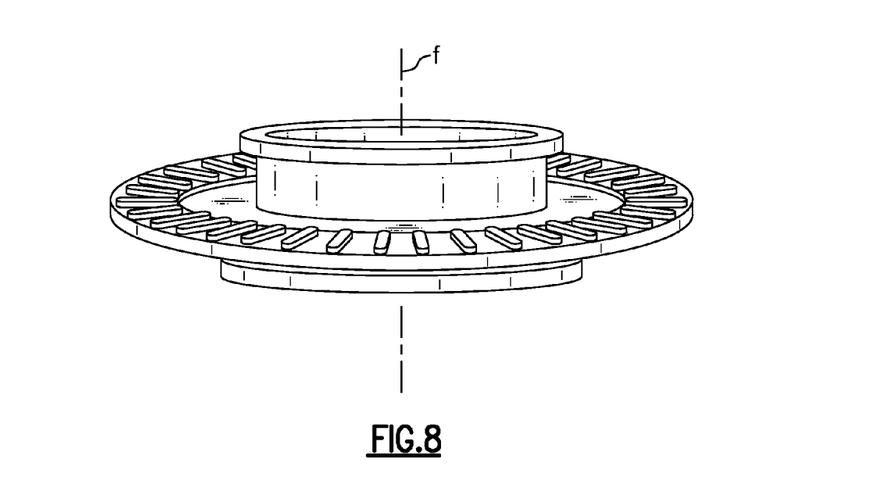
FIG. 8 is a perspective view of the fuel nozzle guide after a machining step.

In step 204, the weld may be finished through a machining operation to return the lip 104 of the hub section 102 to a desired original predetermined dimensional geometry (FIG. 8). It should be understood that additional finishing operations may alternatively or additionally be performed.

Figure 7:
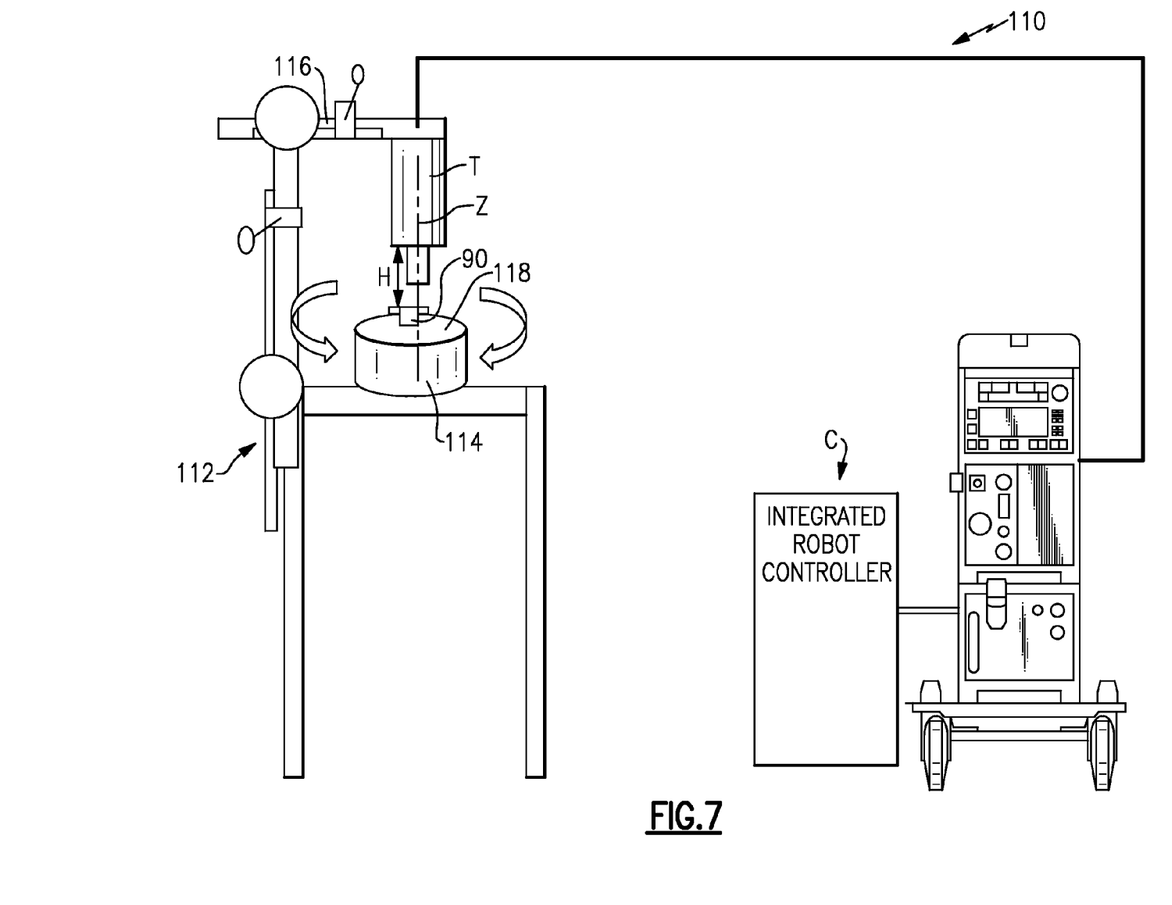
FIG. 7 is a schematic view of a weld system for use with the method of repair.

With reference to FIG. 7, the weld system 110 general includes a fixture 112 which supports the torch T in a desired position and orientation relative to a rotary table 114 or "rotab." The fixture 112 includes a torch holder 116 that is readily adjusted through a rack and pinion, or, other arrangement to locate the torch T in a fixed position relative to the rotary table 114 and thereby relative to the fuel nozzle guide 90 or workpiece to be repaired. That is, the torch T is mechanically fixed along the Z-axis and thus into a desired position relative the fuel nozzle guide 90.

The torch T in the disclosed non-limiting embodiment is oriented to provide between a perpendicular to about a ten (10) degree push or trail orientation relative to the fuel nozzle guide 90. It should be noted that other orientations may be used to maximize weld efficiency. It should also be noted that a computing device C (illustrated schematically) can be used to implement various functionality, such as operation of the torch T and rotation of the rotary table 114. In terms of hardware architecture, such a computing device can include a processor, memory, and one or more input and/or output (I/O) device interface(s) that are communicatively coupled via a local interface as generally understood.

Figure 9:
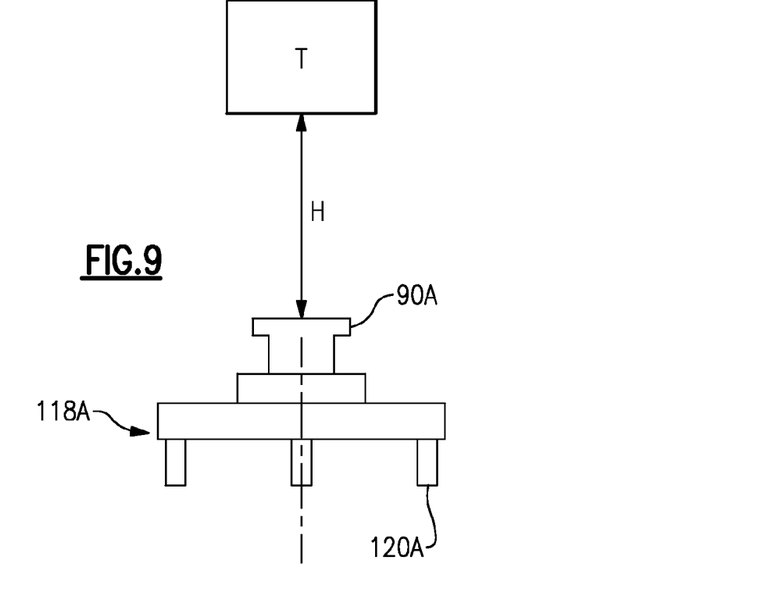
FIG. 9 is a schematic view of a workpiece holder which defines a height specific to a particular fuel nozzle guide for use with the method of repair.
Figure 10:
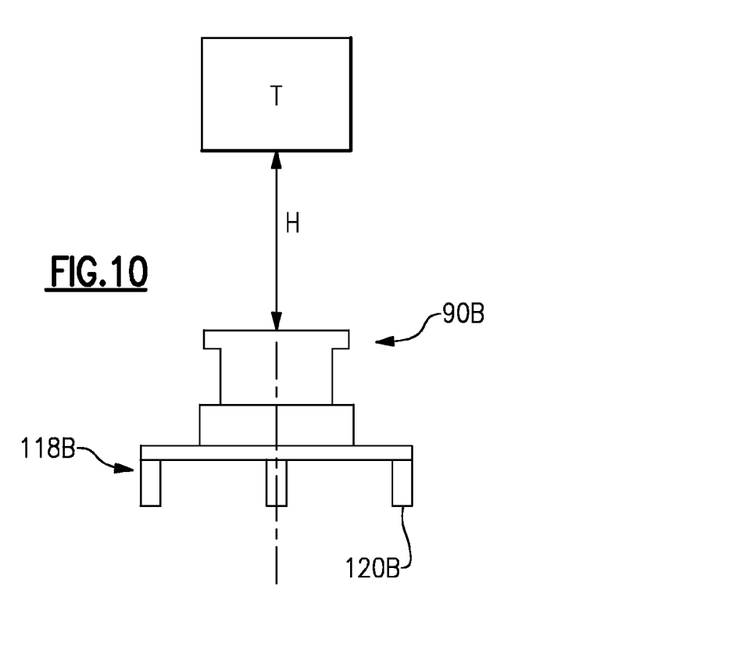
FIG. 10 is a schematic view of another workpiece holder which defines a height specific to another particular fuel nozzle guide for use with the method of repair.

The rotary table 114 may include a workpiece holder 118 that defines a working height H along the Z axis specific to each particular fuel nozzle guide 90. That is, one thick workpiece holder 118A is utilized for a relatively small fuel nozzle guide 90A (FIG. 9) while another thin workpiece holder 118B is utilized for a relatively large or thick fuel nozzle guide 90B (FIG. 10). Either holder may be mounted to the rotary table 114. Such specific workpiece holders permit a single height setting for the fixture 112 to be utilized with various workpieces so as to facilitate high throughput operations. Each workpiece holder 118A, 118B may also include a unique attachment interface 120A, 120B to assure mistake proof installation to the rotary table 114.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fuel nozzle guide for a combustor of a turbine engine comprising:
    an annular base with a hub section, wherein the hub section includes a Cold Metal Transfer (CMT) weld, wherein said Cold Metal Transfer (CMT) weld defines a lip of said hub section, and wherein the Cold Metal Transfer (CMT) weld is a continuous weld.

2. The fuel nozzle guide as recited in claim 1, wherein said hub section is frusto-conical.

3. The fuel nozzle guide as recited in claim 1, wherein said lip has a first diameter and said annular base has a second diameter, and said first diameter is less than said second diameter.

4. The fuel nozzle guide as recited in claim 3, wherein a portion of said fuel nozzle guide between said annular base and said lip has a third diameter, and said third diameter is less than said first and second diameters.

5. The fuel nozzle guide as recited in claim 1, wherein the fuel nozzle guide is a cast metal component.

6. The fuel nozzle guide as recited in claim 1, wherein the hub section defines a central opening configured to receive a fuel nozzle.

7. The fuel nozzle guide as recited in claim 6, wherein the central opening receives the at least one fuel nozzle in a slip fit relationship.

8. The fuel nozzle guide as recited in claim 6, wherein the central opening is configured to receive the fuel nozzle such that a centerline of the fuel nozzle guide is concurrent with a centerline of the fuel nozzle.

9. The fuel nozzle guide as recited in claim 1, wherein said hub section is frusto-conical, wherein said Cold Metal Transfer (CMT) weld defines a lip of said hub section, said lip having a first diameter and said annular base having a second diameter, and said first diameter is less than said second diameter, and wherein a portion of said fuel nozzle guide between said annular base and said lip has a third diameter, and said third diameter is less than said first and second diameters.

10. The fuel nozzle guide as recited in claim 1, wherein the hub section defines a central opening configured to receive a fuel nozzle, and the central opening receives the at least one fuel nozzle in a slip fit relationship, such that a centerline of the fuel nozzle guide is concurrent with a centerline of the fuel nozzle.

11. A combustor, comprising:
a combustor case;
first and second combustor liners within the combustor case, the first and second combustor liners defining a combustion chamber therebetween;
a forward assembly, the forward assembly including an annular hood, at least one bulkhead assembly, at least one fuel nozzle aligned with the at least one bulkhead assembly, and at least one fuel nozzle guide aligned with the at least one fuel nozzle to define at least one central opening, wherein the at least one fuel nozzle guide includes an annular base with a hub section, wherein the hub section includes a Cold Metal Transfer (CMT) weld, wherein the Cold Metal Transfer (CMT) weld defines a lip of the hub section, and wherein the Cold Metal Transfer (CMT) weld is a continuous weld.

12. The combustor of claim 11, wherein the annular hood extends radially between, and is secured to, forwardmost ends of the first and second combustor liners.

13. The combustor of claim 11, wherein the annular hood includes at least one circumferentially distributed hood port, the at least one circumferentially distributed hood port supporting the at least one fuel nozzle.

14. The combustor of claim 13, wherein the at least one fuel nozzle projects through the at least one hood port and the at least one central opening within the at least one fuel nozzle guides.

15. The combustor of claim 11, wherein at least one fuel nozzle guide projects through the at least one bulkhead assembly.

16. The combustor of claim 15, wherein the at least one bulkhead assembly includes a bulkhead support shell secured to the first and second combustor liners and at least one circumferentially distributed bulkhead heatshields segment secured to the bulkhead support shell around the at least one central opening.

17. The combustor of claim 11, wherein the lip is axially closer to said combustion chamber than the annular base along an axis of the annular hood.

18. The fuel nozzle guide as recited in claim 1, wherein the Cold Metal Transfer (CMT) weld is free from interruptions but for a single start and a single end.

19. The fuel nozzle guide as recited in claim 18, wherein the starting point and the ending point are at the same location of the hub section.

20. The combustor of claim 11, wherein said hub section is frusto-conical, wherein said Cold Metal Transfer (CMT) weld defines a lip of said hub section, said lip having a first diameter and said annular base having a second diameter, and said first diameter is less than said second diameter, and wherein a portion of said fuel nozzle guide between said annular base and said lip has a third diameter, and said third diameter is less than said first and second diameters.

21. The combustor of claim 11, wherein the hub section defines a central opening configured to receive a fuel nozzle, and the central opening receives the at least one fuel nozzle in a slip fit relationship, such that a centerline of the fuel nozzle guide is concurrent with a centerline of the fuel nozzle.

22. The combustor of claim 11, wherein the forward assembly is configured to introduce primary core combustion air into a forward end of the combustion chamber.

23. The combustor of claim 22, wherein the at least one fuel nozzle comprises multiple fuel nozzles, and the multiple fuel nozzles are configured to generate a swirling, blended mixture of fuel and air and provide the swirling, blended mixture to the combustion chamber.

* * * * *